United States Patent
Gass et al.

(10) Patent No.: US 7,357,056 B2
(45) Date of Patent: *Apr. 15, 2008

(54) CUTTING TOOL SAFETY SYSTEM

(75) Inventors: Stephen F. Gass, Wilsonville, OR (US); David A. Fanning, Vancouver, WA (US); J. David Fulmer, Tualatin, OR (US)

(73) Assignee: SD3, LLC, Tualatin, OR (US)

( * ) Notice: Subject to any disclaimer, the term of this patent is extended or adjusted under 35 U.S.C. 154(b) by 143 days.

This patent is subject to a terminal disclaimer.

(21) Appl. No.: 11/190,111

(22) Filed: Jul. 25, 2005

(65) Prior Publication Data

US 2005/0252187 A1 Nov. 17, 2005

Related U.S. Application Data

(63) Continuation of application No. 09/676,190, filed on Sep. 29, 2000, now Pat. No. 7,055,417, and a continuation of application No. 09/929,221, filed on Aug.

(Continued)

(60) Provisional application No. 60/667,485, filed on Mar. 31, 2005.

(51) Int. Cl.
*B23D 19/00* (2006.01)
*B23D 45/16* (2006.01)

(52) U.S. Cl. .............................. 83/478; 83/58; 83/62.1; 83/DIG. 1; 83/490; 83/471.3; 83/581; 30/382; 30/391

(58) Field of Classification Search .................. 83/581, 83/478, 397.1, 62.1, DIG. 1, 58, 477.1, 477.2, 83/490, 485, 487, 456, 590, 665, 523.12, 83/72, 526, 76.8, 491, 544, 397, 471.3, 621; 403/2; 411/2, 34, 550; 30/382, 390, 391
See application file for complete search history.

(56) References Cited

U.S. PATENT DOCUMENTS

| 146,886 A | 1/1874 | Doane et al. |
| 162,814 A | 5/1875 | Graves et al. |

(Continued)

FOREIGN PATENT DOCUMENTS

| CH | 297525 | 6/1954 |

(Continued)

OTHER PUBLICATIONS

Gordon Engineering Corp., Product Catalog, Oct. 1997, pp. cover, 1, 3 and back, Brookfield, Connecticut, US.

(Continued)

*Primary Examiner*—Ghassem Alie (57) ABSTRACT

A woodworking machine is disclosed. The machine includes a cutting tool and a motor adapted to drive the cutting tool. The machine further includes a detection system to detect a dangerous condition between the cutting tool and a person, such as a person coming into contact with the cutting tool. A reaction system is provided to disable the cutting tool, such as by covering, blocking, destroying, wrapping, etc., upon detection by the detection system of the dangerous condition.

1 Claim, 6 Drawing Sheets

Related U.S. Application Data 13, 2001, and a continuation of application No. 09/929,226, filed on Aug. 13, 2001, now Pat. No. 6,920,814, and a continuation of application No. 09/929,227, filed on Aug. 13, 2001, and a continuation of application No. 09/929,234, filed on Aug. 13, 2001, and a continuation of application No. 09/929,235, filed on Aug. 13, 2001, and a continuation of application No. 09/929,236, filed on Aug. 13, 2001, and a continuation of application No. 09/929,237, filed on Aug. 13, 2001, and a continuation of application No. 09/929,238, filed on Aug. 13, 2001, and a continuation of application No. 09/929,240, filed on Aug. 13, 2001, now Pat. No. 7,100,483, and a continuation of application No. 09/929,241, filed on Aug. 13, 2001, now Pat. No. 7,024,975, and a continuation of application No. 09/929,242, filed on Aug. 13, 2001, and a continuation of application No. 09/929,425, filed on Aug. 13, 2001, now Pat. No. 7,137,326, and a continuation of application No. 09/929,426, filed on Aug. 13, 2001, and a continuation of application No. 09/955,418, filed on Sep. 17, 2001, now Pat. No. 6,957,601, and a continuation of application No. 10/047,066, filed on Jan. 14, 2002, now Pat. No. 6,945,148, and a continuation of application No. 10/052,705, filed on Jan. 16, 2002, now Pat. No. 6,994,004, and a continuation of application No. 10/053,390, filed on Jan. 16, 2002, and a continuation of application No. 10/100,211, filed on Mar. 13, 2002, and a continuation of application No. 10/146,527, filed on May 15, 2002, and a continuation of application No. 10/172,553, filed on Jun. 13, 2002, and a continuation of application No. 10/189,027, filed on Jul. 2, 2002, and a continuation of application No. 10/189,031, filed on Jul. 2, 2002, now Pat. No. 7,171,879, and a continuation of application No. 10/197,975, filed on Jul. 18, 2002, now abandoned, and a continuation of application No. 10/202,928, filed on Jul. 25, 2002, now Pat. No. 7,000,514, and a continuation of application No. 10/205,164, filed on Jul. 25, 2002, now Pat. No. 6,945,149, and a continuation of application No. 10/243,042, filed on Sep. 13, 2002, now Pat. No. 7,197,969, and a continuation of application No. 10/251,576, filed on Sep. 20, 2002, now abandoned, and a continuation of application No. 10/292,607, filed on Nov. 12, 2002, now Pat. No. 7,077,039, and a continuation of application No. 10/341,260, filed on Jan. 13, 2003, and a continuation of application No. 10/345,630, filed on Jan. 15, 2003, and a continuation of application No. 10/643,296, filed on Aug. 18, 2003, now abandoned, and a continuation of application No. 10/785,361, filed on Feb. 23, 2004, now Pat. No. 6,997,090, and a continuation of application No. 10/794,161, filed on Mar. 4, 2004, now Pat. No. 7,098,800, and a continuation of application No. 10/923,273, filed on Aug. 20, 2004, and a continuation of application No. 10/923,282, filed on Aug. 20, 2004, now abandoned, and a continuation of application No. 10/923,290, filed on Aug. 20, 2004, and a continuation of application No. 10/932,339, filed on Sep. 1, 2004, and a continuation of application No. 10/984,643, filed on Nov. 8, 2004, and a continuation of application No. 11/026,006, filed on Dec. 31, 2004, and a continuation of application No. 11/026,114, filed on Dec. 31, 2004, and a continuation of application No. 11/027,254, filed on Dec. 31, 2004, and a continuation of application No. 11/027,322, filed on Dec. 31, 2004, now abandoned, and a continuation of application No. 11/027,600, filed on Dec. 31, 2004, and a continuation of application No. 11/045,972, filed on Jan. 28, 2005, and a continuation of application No. 11/061,162, filed on Feb. 18, 2005, and a continuation of application No. 11/098,984, filed on Apr. 4, 2005, and a continuation of application No. 11/107,499, filed on Apr. 15, 2005.

U.S. PATENT DOCUMENTS

| Patent No. | Date | Inventor |
|---|---|---|
| 261,090 A | 7/1882 | Grill |
| 264,412 A | 9/1882 | Kuhlmann |
| 299,480 A | 5/1884 | Kuhlman et al. |
| 302,041 A | 7/1884 | Sill |
| 307,112 A | 10/1884 | Groff |
| 509,253 A | 11/1893 | Shields |
| 545,504 A | 9/1895 | Hoover |
| 869,513 A | 10/1907 | Pfeil |
| 941,726 A | 11/1909 | Pfalzgraf |
| 997,720 A | 7/1911 | Troupenat |
| 1,037,843 A | 9/1912 | Ackley |
| 1,050,649 A | 1/1913 | Harrold et al. |
| 1,054,558 A | 2/1913 | Jones |
| 1,074,198 A | 9/1913 | Phillips |
| 1,082,870 A | 12/1913 | Humason |
| 1,101,515 A | 6/1914 | Adam |
| 1,126,970 A | 2/1915 | Folmer |
| 1,132,129 A | 3/1915 | Stevens |
| 1,148,169 A | 7/1915 | Howe |
| 1,154,209 A | 9/1915 | Rushton |
| 1,205,246 A | 11/1916 | Mowry |
| 1,228,047 A | 5/1917 | Reinhold |
| 1,240,430 A | 9/1917 | Erickson |
| 1,244,187 A | 10/1917 | Frisbie |
| 1,255,886 A | 2/1918 | Jones |
| 1,258,961 A | 3/1918 | Tattersall |
| 1,311,508 A | 7/1919 | Harrold |
| 1,324,136 A | 12/1919 | Turner |
| 1,381,612 A | 6/1921 | Anderson |
| 1,397,606 A | 11/1921 | Smith |
| 1,427,005 A | 8/1922 | McMichael |
| 1,430,983 A | 10/1922 | Granberg |
| 1,464,924 A | 8/1923 | Drummond |
| 1,465,224 A | 8/1923 | Lantz |
| 1,496,212 A | 6/1924 | French |
| 1,511,797 A | 10/1924 | Berghold |
| 1,526,128 A | 2/1925 | Flohr |
| 1,527,587 A | 2/1925 | Hutchinson |
| 1,551,900 A | 9/1925 | Morrow |
| 1,553,996 A | 9/1925 | Federer |
| 1,582,483 A | 4/1926 | Runyan |
| 1,600,604 A | 9/1926 | Sorlien |
| 1,616,478 A | 2/1927 | Watson |
| 1,640,517 A | 8/1927 | Procknow |
| 1,662,372 A | 3/1928 | Ward |
| 1,701,948 A | 2/1929 | Crowe |
| 1,711,490 A | 5/1929 | Drummond |
| 1,712,828 A | 5/1929 | Klehm |
| 1,774,521 A | 9/1930 | Neighbour |
| 1,807,120 A | 5/1931 | Lewis |
| 1,811,066 A | 6/1931 | Tannewitz |
| 1,879,280 A | 9/1932 | James |
| 1,896,924 A | 2/1933 | Ulrich |
| 1,902,270 A | 3/1933 | Tate |
| 1,904,005 A | 4/1933 | Masset |
| 1,910,651 A | 5/1933 | Tautz |
| 1,938,548 A | 12/1933 | Tautz |

| | | | | | | |
|---|---|---|---|---|---|---|
| 1,938,549 A | 12/1933 | Tautz | | 2,978,084 A | 4/1961 | Vilkaitis |
| 1,963,688 A | 6/1934 | Tautz | | 2,984,268 A | 5/1961 | Vuichard |
| 1,988,102 A | 1/1935 | Woodward | | 2,991,593 A | 7/1961 | Cohen |
| 1,993,219 A | 3/1935 | Merrigan | | 3,005,477 A | 10/1961 | Sherwen |
| 2,007,887 A | 7/1935 | Tautz | | 3,011,529 A | 12/1961 | Copp |
| 2,010,851 A | 8/1935 | Drummond | | 3,011,610 A | 12/1961 | Stiebel et al. |
| 2,020,222 A | 11/1935 | Tautz | | 3,013,592 A | 12/1961 | Ambrosio et al. |
| 2,038,810 A | 4/1936 | Tautz | | 3,021,881 A | 2/1962 | Edgemond, Jr. et al. |
| 2,075,282 A | 3/1937 | Hedgpeth | | 3,035,995 A | 5/1962 | Seeley et al. |
| 2,095,330 A | 10/1937 | Hedgpeth | | 3,047,116 A | 7/1962 | Stiebel et al. |
| 2,106,288 A | 1/1938 | Tautz | | 3,085,602 A | 4/1963 | Gaskell |
| 2,106,321 A | 1/1938 | Guertin | | 3,105,530 A | 10/1963 | Peterson |
| 2,121,069 A | 6/1938 | Collins | | 3,129,731 A | 4/1964 | Tyrrell |
| 2,131,492 A | 9/1938 | Ocenasek | | 3,163,732 A | 12/1964 | Abbott |
| 2,163,320 A | 6/1939 | Hammond | | 3,184,001 A | 5/1965 | Reinsch et al. |
| 2,168,282 A | 8/1939 | Tautz | | 3,186,256 A | 6/1965 | Reznick |
| 2,241,556 A | 5/1941 | MacMillin et al. | | 3,207,273 A | 9/1965 | Jurin |
| 2,261,696 A | 11/1941 | Ocenasek | | 3,213,731 A | 10/1965 | Renard |
| 2,265,407 A | 12/1941 | Tautz | | 3,224,474 A | 12/1965 | Bloom |
| 2,286,589 A | 6/1942 | Tannewitz | | 3,232,326 A | 2/1966 | Speer et al. |
| 2,292,872 A | 8/1942 | Eastman | | 3,246,205 A | 4/1966 | Miller |
| 2,299,262 A | 10/1942 | Uremovich | | 3,249,134 A | 5/1966 | Vogl et al. |
| 2,312,118 A | 2/1943 | Neisewander | | 3,306,149 A | 2/1967 | John |
| 2,313,686 A | 3/1943 | Uremovich | | 3,313,185 A | 4/1967 | Drake et al. |
| 2,328,244 A | 8/1943 | Woodward | | 3,315,715 A | 4/1967 | Mytinger |
| 2,352,235 A | 6/1944 | Tautz | | 3,323,814 A | 6/1967 | Phillips |
| 2,377,265 A | 3/1945 | Rady | | 3,337,008 A | 8/1967 | Trachte |
| 2,402,232 A | 6/1946 | Baker | | 3,356,111 A | 12/1967 | Mitchell |
| 2,425,331 A | 8/1947 | Kramer | | 3,386,322 A | 6/1968 | Stone et al. |
| 2,434,174 A | 1/1948 | Morgan | | 3,439,183 A | 4/1969 | Hurst, Jr. |
| 2,452,589 A | 11/1948 | McWhirter et al. | | 3,445,835 A | 5/1969 | Fudaley |
| 2,466,325 A | 4/1949 | Ocenasek | | 3,454,286 A | 7/1969 | Anderson et al. |
| 2,496,613 A | 2/1950 | Wooward | | 3,456,696 A | 7/1969 | Gregory et al. |
| 2,509,813 A | 5/1950 | Dineen | | 3,512,440 A | 5/1970 | Frydmann |
| 2,517,649 A | 8/1950 | Frechtmann | | 3,538,964 A | 11/1970 | Warrick et al. |
| 2,518,684 A | 8/1950 | Harris | | 3,540,338 A | 11/1970 | McEwan et al. |
| 2,530,290 A | 11/1950 | Collins | | 3,554,067 A | 1/1971 | Scutella |
| 2,554,124 A | 5/1951 | Salmont | | 3,566,996 A | 3/1971 | Crossman |
| 2,562,396 A | 7/1951 | Schutz | | 3,580,376 A | 5/1971 | Loshbough |
| 2,572,326 A | 10/1951 | Evans | | 3,581,784 A | 6/1971 | Warrick |
| 2,590,035 A | 3/1952 | Pollak | | 3,613,748 A | 10/1971 | De Pue |
| 2,593,596 A | 4/1952 | Olson | | 3,670,788 A | 6/1972 | Pollak et al. |
| 2,601,878 A | 7/1952 | Anderson | | 3,675,444 A | 7/1972 | Whipple |
| 2,623,555 A | 12/1952 | Eschenburg | | 3,680,609 A | 8/1972 | Menge |
| 2,625,966 A | 1/1953 | Copp | | 3,688,815 A | 9/1972 | Ridenour |
| 2,626,639 A | 1/1953 | Hess | | 3,695,116 A | 10/1972 | Baur |
| 2,661,777 A | 12/1953 | Hitchcock | | 3,696,844 A | 10/1972 | Bernatschek |
| 2,661,780 A | 12/1953 | Morgan | | 3,745,546 A | 7/1973 | Struger et al. |
| 2,675,707 A | 4/1954 | Brown | | 3,749,933 A | 7/1973 | Davidson |
| 2,678,071 A | 5/1954 | Odlum et al. | | 3,754,493 A | 8/1973 | Niehaus et al. |
| 2,690,084 A | 9/1954 | Van Dam | | 3,772,590 A | 11/1973 | Mikulecky et al. |
| 2,695,638 A | 11/1954 | Gaskell | | 3,785,230 A | 1/1974 | Lokey |
| 2,704,560 A | 3/1955 | Woessner | | 3,805,639 A * | 4/1974 | Peter ......................... 74/616 |
| 2,711,762 A | 6/1955 | Gaskell | | 3,805,658 A | 4/1974 | Scott et al. |
| 2,722,246 A * | 11/1955 | Arnoldy ...................... 30/391 | | 3,808,932 A | 5/1974 | Russell |
| 2,731,049 A | 1/1956 | Akin | | 3,829,850 A | 8/1974 | Guetersloh |
| 2,736,348 A | 2/1956 | Nelson | | 3,858,095 A | 12/1974 | Friemann et al. |
| 2,737,213 A | 3/1956 | Richards et al. | | 3,861,016 A | 1/1975 | Johnson et al. |
| 2,758,615 A | 8/1956 | Mastriforte | | 3,863,208 A | 1/1975 | Balban |
| 2,785,710 A | 3/1957 | Mowery, Jr. | | 3,880,032 A | 4/1975 | Green |
| 2,786,496 A | 3/1957 | Eschenburg | | 3,882,744 A | 5/1975 | McCarroll |
| 2,810,408 A | 10/1957 | Boice et al. | | 3,886,413 A | 5/1975 | Dow et al. |
| 2,844,173 A | 7/1958 | Gaskell | | 3,889,567 A | 6/1975 | Sato et al. |
| 2,850,054 A | 9/1958 | Eschenburg | | 3,922,785 A | 12/1975 | Fushiya |
| 2,852,047 A | 9/1958 | Odlum et al. | | 3,924,688 A | 12/1975 | Cooper et al. |
| 2,873,773 A | 2/1959 | Gaskell | | 3,931,727 A | 1/1976 | Luenser |
| 2,883,486 A | 4/1959 | Mason | | 3,935,777 A | 2/1976 | Bassett |
| 2,894,546 A | 7/1959 | Eschenburg | | 3,945,286 A | 3/1976 | Smith |
| 2,913,025 A | 11/1959 | Richards | | 3,946,631 A | 3/1976 | Malm |
| 2,913,581 A | 11/1959 | Simonton et al. | | 3,947,734 A | 3/1976 | Fyler |
| 2,945,516 A | 7/1960 | Edgemond, Jr. et al. | | 3,949,636 A | 4/1976 | Ball et al. |
| 2,954,118 A | 9/1960 | Anderson | | 3,953,770 A | 4/1976 | Hayashi |
| 2,957,166 A | 10/1960 | Gluck | | 3,960,310 A | 6/1976 | Nussbaum |

| | | | | | | |
|---|---|---|---|---|---|---|
| 3,967,161 A | | 6/1976 | Lichtblau | 4,683,660 A | * 8/1987 | Schurr | 30/382 |
| 3,970,178 A | * | 7/1976 | Densow .................. 192/105 BA | 4,693,008 A | * 9/1987 | Velie | 30/390 |
| 3,974,565 A | | 8/1976 | Ellis | 4,722,021 A | 1/1988 | Hornung et al. |
| 3,975,600 A | | 8/1976 | Marston | 4,751,603 A | 6/1988 | Kwan |
| 3,978,624 A | | 9/1976 | Merkel et al. | 4,756,220 A | 7/1988 | Olsen et al. |
| 3,994,192 A | | 11/1976 | Faig | 4,757,881 A | 7/1988 | Jonsson et al. |
| 4,007,679 A | | 2/1977 | Edwards | 4,792,965 A | 12/1988 | Morgan |
| 4,016,490 A | | 4/1977 | Weckenmann et al. | 4,805,504 A | 2/1989 | Fushiya et al. |
| 4,026,174 A | | 5/1977 | Fierro | 4,840,135 A | 6/1989 | Yamauchi |
| 4,026,177 A | | 5/1977 | Lokey | 4,845,476 A | 7/1989 | Rangeard et al. |
| 4,029,159 A | | 6/1977 | Nymann | 4,864,455 A | 9/1989 | Shimomura et al. |
| 4,047,156 A | | 9/1977 | Atkins | 4,875,398 A | 10/1989 | Taylor et al. |
| 4,048,886 A | | 9/1977 | Zettler | 4,896,607 A | 1/1990 | Hall et al. |
| 4,060,160 A | | 11/1977 | Lieber | 4,906,962 A | 3/1990 | Duimstra |
| 4,070,940 A | | 1/1978 | McDaniel et al. | 4,934,233 A | 6/1990 | Brundage et al. |
| 4,075,961 A | | 2/1978 | Harris | 4,936,876 A | 6/1990 | Reyes |
| 4,077,161 A | | 3/1978 | Wyle et al. | 4,937,554 A | 6/1990 | Herman |
| 4,085,303 A | | 4/1978 | McIntyre et al. | 4,965,909 A | 10/1990 | McCullough et al. |
| 4,090,345 A | | 5/1978 | Harkness | 4,975,798 A | 12/1990 | Edwards et al. |
| 4,091,698 A | | 5/1978 | Obear et al. | 5,020,406 A | 6/1991 | Sasaki et al. |
| 4,106,378 A | | 8/1978 | Kaiser | 5,025,175 A | 6/1991 | Dubois, III |
| 4,117,752 A | | 10/1978 | Yoneda | 5,046,426 A | 9/1991 | Julien et al. |
| 4,145,940 A | | 3/1979 | Woloveke et al. | 5,052,255 A | 10/1991 | Gaines |
| 4,152,833 A | | 5/1979 | Phillips | 5,074,047 A | 12/1991 | King |
| 4,161,649 A | | 7/1979 | Klos et al. | 5,081,406 A | 1/1992 | Hughes et al. |
| 4,175,452 A | | 11/1979 | Idel | 5,082,316 A | 1/1992 | Wardlaw |
| 4,190,000 A | | 2/1980 | Shaull et al. | 5,083,973 A | 1/1992 | Townsend |
| 4,195,722 A | | 4/1980 | Anderson et al. | 5,086,890 A | 2/1992 | Turczyn et al. |
| 4,199,930 A | | 4/1980 | Lebet et al. | 5,094,000 A | 3/1992 | Becht et al. |
| 4,249,117 A | | 2/1981 | Leukhardt et al. | 5,119,555 A | 6/1992 | Johnson |
| 4,249,442 A | | 2/1981 | Fittery | 5,122,091 A | 6/1992 | Townsend |
| 4,262,278 A | | 4/1981 | Howard et al. | 5,125,160 A | * 6/1992 | Gassen | 30/382 |
| 4,267,914 A | | 5/1981 | Saar | 5,129,300 A | * 7/1992 | Kawakami | 83/471.2 |
| 4,270,427 A | | 6/1981 | Colberg et al. | 5,174,349 A | 12/1992 | Svetlik et al. |
| 4,276,799 A | | 7/1981 | Muehling | 5,184,403 A | * 2/1993 | Schliemann | 30/123.4 |
| 4,291,794 A | | 9/1981 | Bauer | 5,184,534 A | 2/1993 | Lee |
| 4,302,879 A | * | 12/1981 | Murray ........................ 30/382 | 5,198,702 A | 3/1993 | McCullough et al. |
| 4,305,442 A | | 12/1981 | Currie | 5,199,343 A | 4/1993 | OBanion |
| 4,321,841 A | | 3/1982 | Felix | 5,201,684 A | 4/1993 | DeBois, III |
| 4,370,810 A | * | 2/1983 | Schurr et al. ................. 30/382 | 5,207,253 A | 5/1993 | Hoshino et al. |
| 4,372,202 A | | 2/1983 | Cameron | 5,212,621 A | 5/1993 | Panter |
| 4,391,358 A | | 7/1983 | Haeger | 5,218,189 A | 6/1993 | Hutchison |
| 4,418,597 A | | 12/1983 | Krusemark et al. | 5,231,359 A | 7/1993 | Masuda et al. |
| 4,466,233 A | | 8/1984 | Thesman | 5,231,906 A | 8/1993 | Kogej |
| 4,470,046 A | | 9/1984 | Betsill | 5,239,978 A | 8/1993 | Plangetis |
| 4,510,489 A | | 4/1985 | Anderson, III et al. | 5,245,879 A | 9/1993 | McKeon |
| 4,512,224 A | | 4/1985 | Terauchi | 5,257,570 A | 11/1993 | Shiotani et al. |
| 4,518,043 A | | 5/1985 | Anderson et al. | 5,265,510 A | 11/1993 | Hoyer-Ellefsen |
| 4,532,501 A | | 7/1985 | Hoffman | 5,272,946 A | 12/1993 | McCullough et al. |
| 4,532,844 A | | 8/1985 | Chang et al. | 5,276,431 A | 1/1994 | Piccoli et al. |
| 4,557,168 A | | 12/1985 | Tokiwa | 5,285,708 A | 2/1994 | Bosten et al. |
| 4,560,033 A | | 12/1985 | DeWoody et al. | 5,320,382 A | 6/1994 | Goldstein et al. |
| 4,566,512 A | | 1/1986 | Wilson | 5,321,230 A | 6/1994 | Shanklin et al. |
| 4,573,556 A | | 3/1986 | Andreasson | 5,331,875 A | 7/1994 | Mayfield |
| 4,576,073 A | | 3/1986 | Stinson | 5,353,670 A | 10/1994 | Metzger, Jr. |
| 4,589,047 A | | 5/1986 | Gaus et al. | 5,377,554 A | 1/1995 | Reulein et al. |
| 4,589,860 A | | 5/1986 | Brandenstein et al. | 5,377,571 A | 1/1995 | Josephs |
| 4,599,597 A | | 7/1986 | Rotbart | 5,392,568 A | 2/1995 | Howard, Jr. et al. |
| 4,599,927 A | | 7/1986 | Eccardt et al. | 5,392,678 A | 2/1995 | Sasaki et al. |
| 4,606,251 A | | 8/1986 | Boileau | 5,401,928 A | 3/1995 | Kelley |
| 4,615,247 A | | 10/1986 | Berkeley | 5,411,221 A | 5/1995 | Collins et al. |
| 4,621,300 A | | 11/1986 | Summerer | 5,436,613 A | 7/1995 | Ghosh et al. |
| 4,625,406 A | * | 12/1986 | Fushiya et al. ................ 30/381 | 5,451,750 A | 9/1995 | An |
| 4,625,604 A | | 12/1986 | Handler et al. | 5,453,903 A | 9/1995 | Chow |
| 4,635,364 A | * | 1/1987 | Noll et al. .................... 30/381 | 5,471,888 A | 12/1995 | McCormick |
| 4,637,188 A | | 1/1987 | Crothers | 5,480,009 A | 1/1996 | Wieland et al. |
| 4,637,289 A | | 1/1987 | Ramsden | 5,503,059 A | 4/1996 | Pacholok |
| 4,644,832 A | | 2/1987 | Smith | 5,510,685 A | 4/1996 | Grasselli |
| 4,653,189 A | | 3/1987 | Andreasson | 5,513,548 A | 5/1996 | Garuglieri |
| 4,657,428 A | | 4/1987 | Wiley | 5,534,836 A | 7/1996 | Schenkel et al. |
| 4,672,500 A | | 6/1987 | Tholome et al. | 5,572,916 A | 11/1996 | Takano |
| 4,675,664 A | | 6/1987 | Cloutier et al. | 5,587,618 A | 12/1996 | Hathaway |
| 4,679,719 A | | 7/1987 | Kramer | 5,592,353 A | 1/1997 | Shinohara et al. |

| Patent Number | Date | Inventor |
|---|---|---|
| 5,606,889 A | 3/1997 | Bielinski et al. |
| 5,623,860 A | 4/1997 | Schoene et al. |
| 5,648,644 A | 7/1997 | Nagel |
| 5,659,454 A | 8/1997 | Vermesse |
| 5,667,152 A | 9/1997 | Mooring |
| 5,671,633 A | 9/1997 | Wagner |
| 5,695,306 A | 12/1997 | Nygren, Jr. |
| 5,700,165 A | 12/1997 | Harris et al. |
| 5,724,875 A | 3/1998 | Meredith et al. |
| 5,730,165 A | 3/1998 | Philipp |
| 5,741,048 A | 4/1998 | Eccleston |
| 5,755,148 A | 5/1998 | Stumpf et al. |
| 5,771,742 A | 6/1998 | Bokaie et al. |
| 5,782,001 A | 7/1998 | Gray |
| 5,787,779 A | 8/1998 | Garuglieri |
| 5,791,057 A | 8/1998 | Nakamura et al. |
| 5,791,223 A | 8/1998 | Lanzer |
| 5,791,224 A | 8/1998 | Suzuki et al. |
| 5,791,441 A | 8/1998 | Matos et al. |
| 5,819,619 A | 10/1998 | Miller et al. |
| 5,852,951 A | 12/1998 | Santi |
| 5,861,809 A | 1/1999 | Eckstein et al. |
| 5,875,698 A | 3/1999 | Ceroll et al. |
| 5,921,367 A | 7/1999 | Kashioka et al. |
| 5,930,096 A | 7/1999 | Kim |
| 5,937,720 A | 8/1999 | Itzov |
| 5,942,975 A | 8/1999 | Sorensen |
| 5,943,932 A | 8/1999 | Sberveglieri |
| 5,950,514 A | 9/1999 | Benedict et al. |
| 5,963,173 A | 10/1999 | Lian et al. |
| 5,974,927 A | 11/1999 | Tsune |
| 5,989,116 A | 11/1999 | Johnson et al. |
| 6,018,284 A | 1/2000 | Rival et al. |
| 6,037,729 A | 3/2000 | Woods et al. |
| D422,290 S | 4/2000 | Welsh et al. |
| 6,052,884 A | 4/2000 | Steckler et al. |
| 6,095,092 A | 8/2000 | Chou |
| 6,119,984 A | 9/2000 | Devine |
| 6,131,629 A | 10/2000 | Puzio et al. |
| 6,133,818 A | 10/2000 | Shieh et al. |
| 6,141,192 A | 10/2000 | Garzon |
| 6,148,504 A | 11/2000 | Schmidt et al. |
| 6,150,826 A | 11/2000 | Hokodate et al. |
| 6,170,370 B1 | 1/2001 | Sommerville |
| 6,244,149 B1 | 6/2001 | Ceroll et al. |
| 6,257,061 B1 | 7/2001 | Nonoyama et al. |
| 6,330,848 B1 | 12/2001 | Nishio et al. |
| 6,352,137 B1 | 3/2002 | Stegall et al. |
| 6,366,099 B1 | 4/2002 | Reddi |
| 6,376,939 B1 | 4/2002 | Suzuki et al. |
| 6,404,098 B1 | 6/2002 | Kayama et al. |
| 6,405,624 B2 | 6/2002 | Sutton |
| 6,418,829 B1 | 7/2002 | Pilchowski |
| 6,420,814 B1 | 7/2002 | Bobbio |
| 6,427,570 B1 | 8/2002 | Miller et al. |
| 6,430,007 B1 | 8/2002 | Jabbari |
| 6,431,425 B1 | 8/2002 | Moorman et al. |
| 6,450,077 B1 | 9/2002 | Ceroll et al. |
| 6,453,786 B1 | 9/2002 | Ceroll et al. |
| 6,460,442 B2 | 10/2002 | Talesky et al. |
| 6,471,106 B1 | 10/2002 | Reining |
| 6,479,958 B1 | 11/2002 | Thompson et al. |
| D466,913 S | 12/2002 | Ceroll et al. |
| 6,492,802 B1 | 12/2002 | Bielski |
| D469,354 S | 1/2003 | Curtsinger |
| 6,502,493 B1 | 1/2003 | Eccardt et al. |
| 6,536,536 B1 | 3/2003 | Gass et al. |
| 6,543,324 B2 | 4/2003 | Dils |
| 6,546,835 B2 | 4/2003 | Wang |
| 6,575,067 B2 | 6/2003 | Parks et al. |
| 6,578,460 B2 | 6/2003 | Sartori |
| 6,578,856 B2 | 6/2003 | Kahle |
| 6,595,096 B2 | 7/2003 | Ceroll et al. |
| D478,917 S | 8/2003 | Ceroll et al. |
| 6,601,493 B1 | 8/2003 | Crofutt |
| 6,607,015 B1 | 8/2003 | Chen |
| D479,538 S | 9/2003 | Welsh et al. |
| 6,617,720 B1 | 9/2003 | Egan, III et al. |
| 6,619,348 B2 | 9/2003 | Wang |
| 6,640,683 B2 | 11/2003 | Lee |
| 6,644,157 B2 | 11/2003 | Huang |
| 6,647,847 B2 | 11/2003 | Hewitt et al. |
| 6,659,233 B2 | 12/2003 | DeVlieg |
| 6,736,042 B2 | 5/2004 | Behne et al. |
| 6,742,430 B2 | 6/2004 | Chen |
| 6,796,208 B1 | 9/2004 | Jorgensen |
| 6,826,988 B2 | 12/2004 | Gass et al. |
| 6,857,345 B2 | 2/2005 | Gass et al. |
| 6,874,397 B2 | 4/2005 | Chang |
| 6,874,399 B2 | 4/2005 | Lee |
| 6,877,410 B2 | 4/2005 | Gass et al. |
| 6,880,440 B2 | 4/2005 | Gass et al. |
| 6,920,814 B2 | 7/2005 | Gass et al. |
| 6,945,148 B2 | 9/2005 | Gass et al. |
| 6,945,149 B2 | 9/2005 | Gass et al. |
| 2002/0017175 A1 | 2/2002 | Gass et al. |
| 2002/0017176 A1 | 2/2002 | Gass et al. |
| 2002/0017178 A1 | 2/2002 | Gass et al. |
| 2002/0017179 A1 | 2/2002 | Gass et al. |
| 2002/0017180 A1 | 2/2002 | Gass et al. |
| 2002/0017181 A1 | 2/2002 | Gass et al. |
| 2002/0017182 A1 | 2/2002 | Gass et al. |
| 2002/0017184 A1 | 2/2002 | Gass et al. |
| 2002/0017336 A1 | 2/2002 | Gass et al. |
| 2002/0020261 A1 | 2/2002 | Gass et al. |
| 2002/0020262 A1 | 2/2002 | Gass et al. |
| 2002/0020263 A1 | 2/2002 | Gass et al. |
| 2002/0020265 A1 | 2/2002 | Gass et al. |
| 2002/0020271 A1 | 2/2002 | Gass et al. |
| 2002/0056349 A1 | 5/2002 | Gass et al. |
| 2002/0056350 A1 | 5/2002 | Gass et al. |
| 2002/0059853 A1 | 5/2002 | Gass et al. |
| 2002/0059854 A1 | 5/2002 | Gass et al. |
| 2002/0069734 A1 | 6/2002 | Gass et al. |
| 2002/0096030 A1 | 7/2002 | Wang |
| 2002/0109036 A1 | 8/2002 | Denen et al. |
| 2002/0170399 A1 | 11/2002 | Gass et al. |
| 2002/0170400 A1 | 11/2002 | Gass |
| 2002/0190581 A1 | 12/2002 | Gass et al. |
| 2003/0002942 A1 | 1/2003 | Gass et al. |
| 2003/0005588 A1 | 1/2003 | Gass et al. |
| 2003/0015253 A1 | 1/2003 | Gass et al. |
| 2003/0019341 A1 | 1/2003 | Gass et al. |
| 2003/0037651 A1 | 2/2003 | Gass et al. |
| 2003/0037655 A1 | 2/2003 | Chin-Chin |
| 2003/0056853 A1 | 3/2003 | Gass et al. |
| 2003/0058121 A1 | 3/2003 | Gass et al. |
| 2003/0074873 A1 | 4/2003 | Freiberg et al. |
| 2003/0089212 A1 | 5/2003 | Parks et al. |
| 2003/0090224 A1 | 5/2003 | Gass et al. |
| 2003/0101857 A1 | 6/2003 | Chuang |
| 2003/0109798 A1 | 6/2003 | Kermani |
| 2003/0131703 A1 | 7/2003 | Gass et al. |
| 2003/0140749 A1 | 7/2003 | Gass et al. |
| 2004/0011177 A1 | 1/2004 | Huang |
| 2004/0040426 A1 | 3/2004 | Gass et al. |
| 2004/0060404 A1 | 4/2004 | Metzger, Jr. |
| 2004/0104085 A1 | 6/2004 | Lang et al. |
| 2004/0159198 A1 | 8/2004 | Peot et al. |
| 2004/0194594 A1 | 10/2004 | Dils et al. |
| 2004/0200329 A1 | 10/2004 | Sako |
| 2004/0226424 A1 | 11/2004 | O'Banion et al. |
| 2004/0226800 A1 | 11/2004 | Pierga et al. |
| 2005/0057206 A1 | 3/2005 | Uneyama |
| 2005/0066784 A1 | 3/2005 | Gass |
| 2005/0092149 A1 | 5/2005 | Hartmann |

| | | | |
|---|---|---|---|
| 2005/0139051 A1 | 6/2005 | Gass et al. | |
| 2005/0139056 A1 | 6/2005 | Gass et al. | |
| 2005/0139057 A1 | 6/2005 | Gass et al. | |
| 2005/0139058 A1 | 6/2005 | Gass et al. | |
| 2005/0139459 A1 | 6/2005 | Gass et al. | |
| 2005/0155473 A1 | 7/2005 | Gass | |
| 2005/0166736 A1 | 8/2005 | Gass et al. | |
| 2005/0178259 A1 | 8/2005 | Gass et al. | |
| 2005/0204885 A1 | 9/2005 | Gass et al. | |

FOREIGN PATENT DOCUMENTS

| | | | |
|---|---|---|---|
| DE | 76186 | | 8/1921 |
| DE | 2800403 | | 7/1979 |
| DE | 3427733 | | 1/1986 |
| DE | 4235161 | A1 | 5/1993 |
| DE | 4326313 | | 2/1995 |
| DE | 19609771 | | 6/1998 |
| EP | 146460 | | 11/1988 |
| ES | 2152184 | | 1/2001 |
| FR | 2556643 | | 6/1985 |
| FR | 2570017 | | 3/1986 |
| GB | 598204 | | 2/1948 |
| GB | 5980204 | | 2/1948 |
| GB | 1132708 | | 11/1968 |
| GB | 2096844 | | 10/1982 |
| GB | 2142571 | | 1/1985 |

OTHER PUBLICATIONS

Analog Devices, Inc., 3-Axis Capacitive Sensor—Preliminary Technical Data AD7103, pp. 1-40, © 1998.

U.S. Appl. No. 60/157,340, filed Oct. 1, 1999, entitled "Fast-Acting Safety Stop."

U.S. Appl. No. 60/182,866, filed Feb. 16, 2000, entitled "Fast-Acting Safety Stop."

IWF 2000 Challengers Award Official Entry Form, submitted Apr. 26, 2000, 6 pages plus CD (the portions of U.S. patent applications referenced in the form are from U.S. Appl. No. 60/157,340, filed Oct. 1, 1999 and U.S. Appl. No. 60/182,866 filed Feb. 16, 2000).

*You Should Have Invented It*, French television show CD, date unknown.

\* cited by examiner

CUTTING TOOL SAFETY SYSTEM

CROSS-REFERENCE TO RELATED APPLICATIONS

This application claims priority to and is a continuation of the following U.S. patent application Ser. No. 09/676,190, filed Sep. 29, 2000; now U.S. Pat. No. 7,055,417 Ser. No. 09/929,221, filed Aug. 13, 2001; Ser. No. 09/929,226, filed Aug. 13, 2001 now U.S. Pat. No. 6,920,814; Ser. No. 09/929,227, filed Aug. 13, 2001; Ser. No. 09/929,234, filed Aug. 13, 2001; Ser. No. 09/929,235, filed Aug. 13, 2001; Ser. No. 09/929,236, filed Aug. 13, 2001; Ser. No. 09/929,237, filed Aug. 13, 2001; Ser. No. 09/929,238, filed Aug. 13, 2001; Ser. No. 09/929,240, filed Aug. 13, 2001; now U.S. Pat. No. 7,100,483 Ser. No. 09/929,241, now U.S. Pat. No. 7,024,975 filed Aug. 13, 2001; Ser. No. 09/929,242, filed Aug. 13, 2001; Ser. No. 09/929,425, filed Aug. 13, 2001; now U.S. Pat. No. 7,137,326 Ser. No. 09/929,426, filed Aug. 13, 2001; Ser. No. 09/955,418, filed Sep. 17, 2001; now U.S. Pat. No. 6,957,601 Ser. No. 10/047,066, filed Jan. 14, 2002; now U.S. Pat. No. 6,945,148 Ser. No. 10/052,705, filed Jan. 16, 2002; now U.S. Pat. No. 6,994,004 Ser. No. 10/053,390, filed Jan. 16, 2002; Ser. No. 10/100,211, filed Mar. 13, 2002; Ser. No. 10/146,527, filed May 15, 2002; Ser. No. 10/172,553, filed Jun. 13, 2002; Ser. No. 10/189,027, filed Jul. 2, 2002; Ser. No. 10/189,031, filed Jul. 2, 2002; now U.S. Pat. No. 7,171,879 Ser. No. 10/197,975, filed Jul. 18, 2002; now abandoned Ser. No. 10/202,928, filed Jul. 25, 2002; now U.S. Pat. No. 7,000,514 Ser. No. 10/205,164, filed Jul. 25, 2002; now U.S. Pat. No. 6,945,149 Ser. No. 10/243,042, filed Sep. 13, 2002; now U.S. Pat. 7,197,969 Ser. No. 10/251,576, filed Sep. 20, 2002; now abandoned Ser. No. 10/292,607, filed Nov. 12, 2002; now U.S. Pat. No. 7,077,039 Ser. No. 10/341,260, filed Jan. 13, 2003; Ser. No. 10/345,630, filed Jan. 15, 2003; Ser. No. 10/643,296, filed Aug. 18, 2003; now abandoned Ser. No. 10/785,361, filed Feb. 23, 2004; now U.S. Pat. No. 6,997,090 Ser. No. 10/794,161, filed Mar. 4, 2004; now U.S. Pat. No. 7,098,800 Ser. No. 10/923,273, filed Aug. 20, 2004; Ser. No. 10/923,282, filed Aug. 20, 2004; now abandoned Ser. No. 10/923,290, filed Aug. 20, 2004; Ser. No. 10/932,339, filed Sep. 1, 2004; Ser. No. 10/984,643, filed Nov. 8, 2004; Ser. No. 11/026,006, filed Dec. 31, 2004; Ser. No. 11/026,114, filed Dec. 31, 2004; Ser. No. 11/027,254, filed Dec. 31, 2004; Ser. No. 11/027,322, filed Dec. 31, 2004; now abandoned Ser. No. 11/027,600, filed Dec. 31, 2004; Ser. No. 11/045,972, filed Jan. 28, 2005; Ser. No. 11/061,162, filed Feb. 18, 2005; Ser. No. 11/098,984, filed Apr. 4, 2005; Ser. No. 11/107,499, filed Apr. 15, 2005; Ser. No. 60/667,485, filed Mar. 31, 2005. All of the above applications are hereby incorporated by reference in their entirety for all purposes.

FIELD

The present invention relates to safety systems for cutting equipment, and more particularly to a system for reducing injury in the event of contact between a user and a cutting tool.

BACKGROUND

Many types of cutting machinery present a risk of injury because a user may accidentally contact the cutting tool during operation. For instance, every year, many thousands of people suffer amputation of one or more fingers while operating table saws. Various systems have been proposed to address this danger. For instance, U.S. Pat. No. 5,081,406 describes a system designed to detect dangerous proximity and trigger the shut down of a piece of equipment to avoid injury.

As another example, U.S. Pat. No. 3,858,095 describes a system that is purportedly able to stop a band blade on a band cutter machine used in the textile industry in about $\frac{1}{200}^{th}$ of a second in the event contact between a user and the cutting blade is detected. However, it seems unlikely that the system set forth in the '095 patent could have worked to stop the blade in the time specified. In particular, assuming two 20-cm radiuses, 2-kg band wheels, the torque required to stop the wheels alone in $\frac{1}{200}$th of a second is over 1000 N/M. The braking action is described as being provided by the winding of the drive motor and an electromagnetic brake. However, the motor for a band saw with 20-cm wheels might be a few horsepower at most, while supplying sufficient torque to slow just the wheels would require about 60 hp of power. In addition, the armature of a motor of a few horsepower would most probably have inertia greater than the wheels. Therefore, the motor would not even be able to stop itself in $\frac{1}{200}^{th}$ of a second, let alone the wheels of the band saw. The electromagnetic brake would be of little more help. By way of example, a Stearns SM-250 electromagnetic clutch/brake that sells for almost $1000,can only provide about 200N/M of stopping torque. Therefore, even with the combination of the motor and an expensive electromagnetic brake, the system of the '095 patent would not appear to stop the blade in $\frac{1}{200}^{th}$ of a second. Moreover, the system of the '095 patent relies on switching of relays to control actuation of the brake and motor. However, relays normally take 5-15 milliseconds to operate, so it is unlikely the electromagnetic brake or the motor braking could even be engaged within $\frac{1}{200}^{th}$ of a second, let alone stop the blade.

As another example, U.S. Pat. No. 3,785,230 to Lokey describes a system for use on a hand-held circular saw for stopping the blade in the event a user's hand comes in dangerous proximity to the blade. This system uses a solenoid to shift a pair of cams into contact with opposed points on the side of the blade.

Due to the deficiencies with existing brake systems, it would be desirable to have a safety system that could be actuated quickly to protect a user against injury from a cutter.

DETAILED DESCRIPTION

Figure 1:
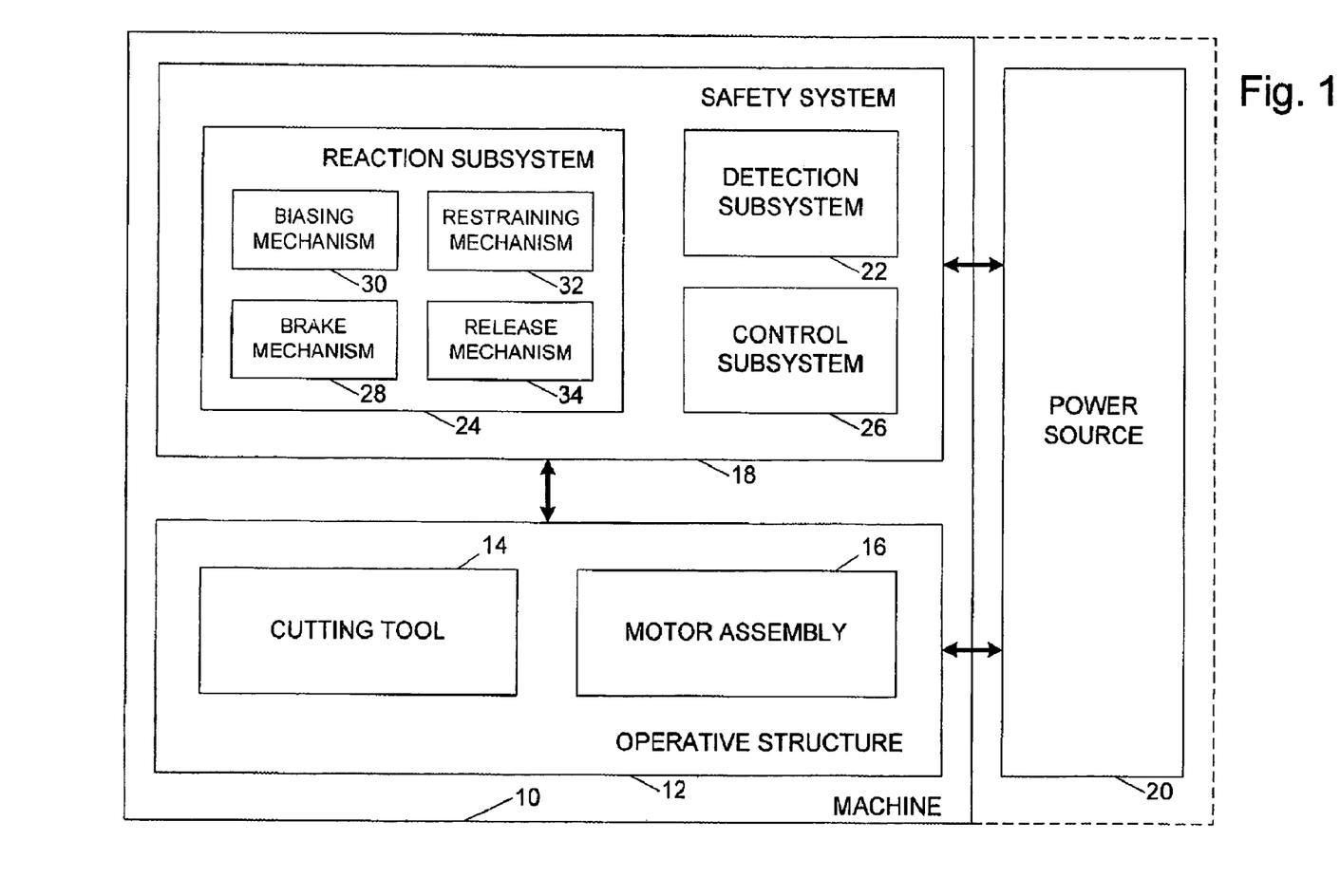
FIG. 1 is a schematic block diagram of a machine with a fast-acting safety system according to the present invention.

A machine that may incorporate a cutting tool safety system according to the present invention is shown schematically in FIG. 1 and indicated generally at 10. Machine 10 may be any of a variety of different machines adapted for cutting workpieces, such as wood, including a table saw, miter saw (chop saw), radial arm saw, circular saw, band saw, jointer, planer, etc. Machine 10 includes an operative structure 12 having a cutting tool 14 and a motor assembly 16 adapted to drive the cutting tool. Machine 10 also includes a safety system 18 configured to minimize the potential of a serious injury to a person using machine 10. Safety system 18 is adapted to detect the occurrence of one or more dangerous conditions during use of machine 10. If such a dangerous condition is detected, safety system 18 is adapted to engage operative structure 12 to limit any injury to the user caused by the dangerous condition.

Machine 10 also includes a suitable power source 20 to provide power to operative structure 12 and safety system 18. Power source 20 may be an external power source such as line current, or an internal power source such as a battery. Alternatively, power source 20 may include a combination of both external and internal power sources. Furthermore, power source 20 may include two or more separate power sources, each adapted to power different portions of machine 10.

It will be appreciated that operative structure 12 may take any one of many different forms, depending on the type of machine 10. For example, operative structure 12 may include a stationary housing configured to support motor assembly 16 in driving engagement with cutting tool 14. Alternatively, operative structure 12 may include a movable structure configured to carry cutting tool 14 between multiple operating positions. As a further alternative, operative structure 12 may include one or more transport mechanisms adapted to convey a workpiece toward and/or away from cutting tool 14.

Motor assembly 16 includes one or more motors adapted to drive cutting tool 14. The motors may be either directly or indirectly coupled to the cutting tool, and may also be adapted to drive workpiece transport mechanisms. Cutting tool 14 typically includes one or more blades or other suitable cutting implements that are adapted to cut or remove portions from the workpieces. The particular form of cutting tool 14 will vary depending upon the various embodiments of machine 10. For example, in table saws, miter saws, circular saws and radial arm saws, cutting tool 14 will typically include one or more circular rotating blades having a plurality of teeth disposed along the perimetrical edge of the blade. For a jointer or planer, the cutting tool typically includes a plurality of radially spaced-apart blades. For a band saw, the cutting tool includes an elongate, circuitous tooth-edged band.

Safety system 18 includes a detection subsystem 22, a reaction subsystem 24 and a control subsystem 26. Control subsystem 26 may be adapted to receive inputs from a variety of sources including detection subsystem 22, reaction subsystem 24, operative structure 12 and motor assembly 16. The control subsystem may also include one or more sensors adapted to monitor selected parameters of machine 10. In addition, control subsystem 26 typically includes one or more instruments operable by a user to control the machine. The control subsystem is configured to control machine 10 in response to the inputs it receives.

Detection subsystem 22 is configured to detect one or more dangerous, or triggering, conditions during use of machine 10. For example, the detection subsystem may be configured to detect that a portion of the user's body is dangerously close to, or in contact with, a portion of cutting tool 14. As another example, the detection subsystem may be configured to detect the rapid movement of a workpiece due to kickback by the cutting tool, as is described in U.S. Provisional Patent Application Ser. No. 60/182,866, filed Feb. 16, 2000, the disclosure of which is herein incorporated by reference. In some embodiments, detection subsystem 22 may inform control subsystem 26 of the dangerous condition, which then activates reaction subsystem 24. In other embodiments, the detection subsystem may be adapted to activate the reaction subsystem directly.

Once activated in response to a dangerous condition, reaction subsystem 24 is configured to engage operative structure 12 quickly to prevent serious injury to the user. It will be appreciated that the particular action to be taken by reaction subsystem 24 will vary depending on the type of machine 10 and/or the dangerous condition that is detected. For example, reaction subsystem 24 may be configured to do one or more of the following: stop the movement of cutting tool 14, disconnect motor assembly 16 from power source 20, place a barrier between the cutting tool and the user, or retract the cutting tool from its operating position, etc. The reaction subsystem may be configured to take a combination of steps to protect the user from serious injury. Placement of a barrier between the cutting tool and teeth is described in more detail below. Retraction of the cutting tool from its operating position is described in more detail in U.S. Provisional Patent Application Ser. No. 60/225,089, filed Aug. 14, 2000, entitled "Retraction System For Use In Power Equipment," and U.S. patent application Ser. No. 09/929,242, filed Aug. 13, 2001, entitled "Retraction System For Use In Power Equipment," the disclosures of which are herein incorporated by reference.

The configuration of reaction subsystem 24 typically will vary depending on which action(s) are taken. In the exemplary embodiment depicted in FIG. 1, reaction subsystem 24 is configured to stop the movement of cutting tool 14 and includes a brake mechanism 28, a biasing mechanism 30, a restraining mechanism 32, and a release mechanism 34. Brake mechanism 28 is adapted to engage operative structure 12 under the urging of biasing mechanism 30. During normal operation of machine 10, restraining mechanism 32 holds the brake mechanism out of engagement with the operative structure. However, upon receipt of an activation signal by reaction subsystem 24, the brake mechanism is released from the restraining mechanism by release mechanism 34, whereupon, the brake mechanism quickly engages at least a portion of the operative structure to bring the cutting tool to a stop.

Figure 2:
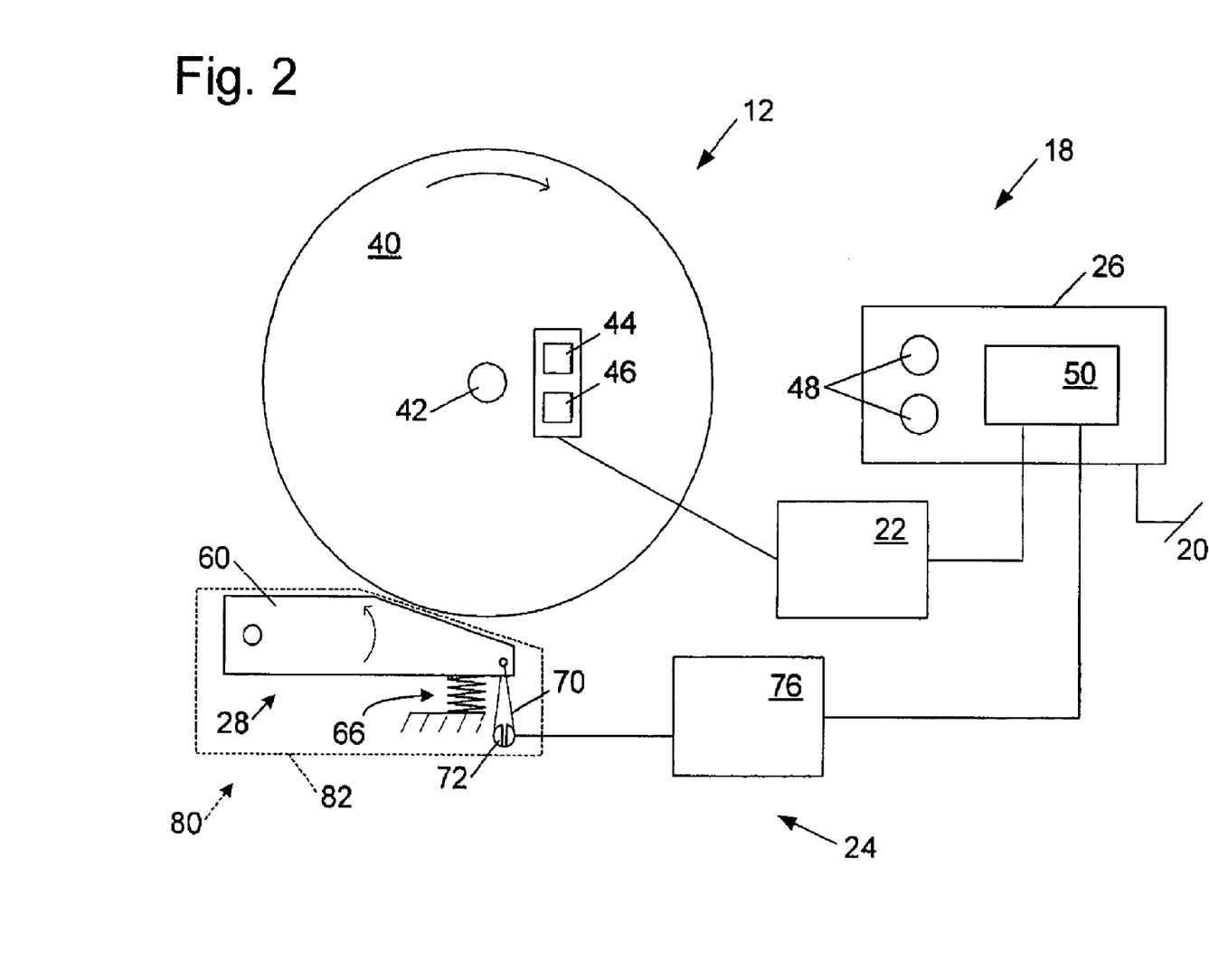
FIG. 2 is a schematic diagram of an exemplary safety system in the context of a machine having a circular blade.

It will be appreciated by those of skill in the art that the exemplary embodiment depicted in FIG. 1 and described above may be implemented in a variety of ways depending on the type and configuration of operative structure 12. Turning attention to FIG. 2, one example of the many possible implementations of safety system 18 is shown. System 18 is configured to engage an operative structure having a cutting tool in the form of a circular blade 40 mounted on a rotating shaft or arbor 42. Blade 40 includes a plurality of cutting teeth (not shown) disposed around the outer edge of the blade. As described in more detail below, braking mechanism 28 is adapted to engage the teeth of blade 40 and stop the rotation of the blade. U.S. Provisional Patent Application Ser. No. 60/225,210, filed Aug. 14, 2000, entitled "Translation Stop For Use In Power Equipment," and U.S. patent application Ser. No. 09/929,425, filed Aug.

13, 2001, entitled "Translation Stop For Use In Power Equipment," the disclosures of which are herein incorporated by reference, describe other systems for stopping the movement of the cutting tool. U.S. Provisional Patent Application Ser. No. 60/225,058, filed Aug. 14, 2000, entitled "Table Saw With Improved Safety System," U.S. patent application Ser. No. 09/929,235, filed Aug. 13, 2001, entitled "Table Saw With Improved Safety System," U.S. Provisional Patent Application Ser. No. 60/225,057, filed Aug. 14, 2000, entitled "Miter Saw With Improved Safety System," and U.S. patent application Ser. No. 09/929,238, filed Aug. 13, 2001, entitled "Miter Saw With Improved Safety System," the disclosures of which are herein incorporated by reference, describe safety system 18 in the context of particular types of machines 10.

In the exemplary implementation, detection subsystem 22 is adapted to detect the dangerous condition of the user coming into contact with blade 40. The detection subsystem includes a sensor assembly, such as contact detection plates 44 and 46, capacitively coupled to blade 40 to detect any contact between the user's body and the blade. Typically, the blade, or some larger portion of cutting tool 14 is electrically isolated from the remainder of machine 10. Alternatively, detection subsystem 22 may include a different sensor assembly configured to detect contact in other ways, such as optically, resistively, etc. In any event, the detection subsystem is adapted to transmit a signal to control subsystem 26 when contact between the user and the blade is detected. Various exemplary embodiments and implementations of detection subsystem 22 are described in more detail in U.S. Provisional Patent Application Ser. No. 60/225,200, filed Aug. 14, 2000, entitled "Contact Detection System For Power Equipment," U.S. patent application Ser. No. 09/929, 426, filed Aug. 13, 2001, entitled "Detection System For Power Equipment," U.S. Provisional Patent Application Ser. No. 60/225,211, filed Aug. 14, 2000, entitled "Apparatus And Method For Detecting Dangerous Conditions In Power Equipment," and U.S. patent application Ser. No. 09/929, 221, filed Aug. 13, 2001, entitled "Apparatus And Method For Detecting Dangerous Conditions In Power Equipment," the disclosures of which are herein incorporated by reference.

Control subsystem 26 includes one or more instruments 48 that are operable by a user to control the motion of blade 40. Instruments 48 may include start/stop switches, speed controls, direction controls, etc. Control subsystem 26 also includes a logic controller 50 connected to receive the user's inputs via instruments 48. Logic controller 50 is also connected to receive a contact detection signal from detection subsystem 22. Further, the logic controller may be configured to receive inputs from other sources (not shown) such as blade motion sensors, workpiece sensors, etc. In any event, the logic controller is configured to control operative structure 12 in response to the user's inputs through instruments 48. However, upon receipt of a contact detection signal from detection subsystem 22, the logic controller overrides the control inputs from the user and activates reaction subsystem 24 to stop the motion of the blade. Various exemplary embodiments and implementations of control subsystem 26 are described in more detail in U.S. Provisional Patent Application Ser. No. 60/225,059, filed Aug. 14, 2000, entitled "Logic Control For Fast-Acting Safety System," U.S. patent application Ser. No. 09/929, 237, filed Aug. 13, 2001, entitled "Logic Control For Fast-Acting Safety System," U.S. Provisional Patent Application Ser. No. 60/225,094, filed Aug. 14, 2000, entitled "Motion Detecting System For Use In Safety System For Power Equipment," and U.S. patent application Ser. No. 09/929, 234, filed Aug. 13, 2001, entitled "Motion Detecting System For Use In A Safety System For Power Equipment," the disclosures of which are herein incorporated by reference.

In the exemplary implementation, brake mechanism 28 includes a pawl 60 mounted adjacent the edge of blade 40 and selectively moveable to engage and grip the teeth of the blade. Pawl 60 may be constructed of any suitable material adapted to engage and stop the blade. As one example, the pawl may be constructed of a relatively high strength thermoplastic material such as polycarbonate, ultrahigh molecular weight polyethylene (UHMW) or Acrylonitrile Butadiene Styrene (ABS), etc., or a metal such as aluminum, etc. It will be appreciated that the construction of pawl 60 will vary depending on the configuration of blade 40. In any event, the pawl is urged into the blade by a biasing mechanism in the form of a spring 66. In the illustrative embodiment shown in FIG. 2, pawl 60 is pivoted into the teeth of blade 40. It should be understood that sliding or rotary movement of pawl 60 might also be used. The spring is adapted to urge pawl 60 into the teeth of the blade with sufficient force to grip the blade and quickly bring it to a stop.

The pawl is held away from the edge of the blade by a restraining mechanism in the form of a fusible member 70. The fusible member is constructed of a suitable material adapted to restrain the pawl against the bias of spring 66, and also adapted to melt under a determined electrical current density. Examples of suitable materials for fusible member 70 include NiChrome wire, stainless steel wire, etc. The fusible member is connected between the pawl and a contact mount 72. Preferably, fusible member 70 holds the pawl relatively close to the edge of the blade to reduce the distance the pawl must travel to engage the blade. Positioning the pawl relatively close to the edge of the blade reduces the time required for the pawl to engage and stop the blade. Typically, the pawl is held approximately $\frac{1}{32}$-inch to $\frac{1}{4}$-inch from the edge of the blade by fusible member 70, however other pawl-to-blade spacings may also be used within the scope of the invention.

Pawl 60 is released from its unactuated, or cocked, position to engage blade 40 by a release mechanism in the form of a firing subsystem 76. The firing subsystem is coupled to contact mount 72, and is configured to melt fusible member 70 by passing a surge of electrical current through the fusible member. Firing subsystem 76 is coupled to logic controller 50 and activated by a signal from the logic controller. When the logic controller receives a contact detection signal from detection subsystem 22, the logic controller sends an activation signal to firing subsystem 76, which melts fusible member 70, thereby releasing the pawl to stop the blade. Various exemplary embodiments and implementations of reaction subsystem 24 are described in more detail in U.S. Provisional Patent Application Ser. No. 60/225,056, filed Aug. 14, 2000, entitled "Firing Subsystem For Use In A Fast-Acting Safety System," U.S. patent application Ser. No. 09/929,240, filed Aug. 13, 2001, entitled "Firing Subsystem For Use In A Fast-Acting Safety System," U.S. Provisional Patent Application Ser. No. 60/225,170, filed Aug. 14, 2000, entitled "Spring-Biased Brake Mechanism for Power Equipment," U.S. patent application Ser. No. 09/929,227, filed Aug. 13, 2001, entitled "Spring-Biased Brake Mechanism For Power Equipment," U.S. Provisional Patent Application Ser. No. 60/225,169, filed Aug. 14, 2000, entitled "Brake Mechanism For Power Equipment," and U.S. patent application Ser. No. 09/929, 241, filed Aug. 13, 2001, entitled "Brake Mechanism For Power Equipment," the disclosures of which are herein incorporated by reference.

It will be appreciated that activation of the brake mechanism will require the replacement of one or more portions of safety system 18. For example, pawl 60 and fusible member 70 typically must be replaced before the safety system is ready to be used again. Thus, it may be desirable to construct one or more portions of safety system 18 in a cartridge that can be easily replaced. For example, in the exemplary implementation depicted in FIG. 2, safety system 18 includes a replaceable cartridge 80 having a housing 82. Pawl 60, spring 66, fusible member 70 and contact mount 72 are all mounted within housing 82. Alternatively, other portions of safety system 18 may be mounted within the housing. In any event, after the reaction system has been activated, the safety system can be reset by replacing cartridge 80. The portions of safety system 18 not mounted within the cartridge may be replaced separately or reused as appropriate. Various exemplary embodiments and implementations of a safety system using a replaceable cartridge are described in more detail in U.S. Provisional Patent Application Ser. No. 60/225,201, filed Aug. 14, 2000, entitled "Replaceable Brake Mechanism For Power Equipment," U.S. patent application Ser. No. 09/929,236, filed Aug. 13, 2001, entitled "Replaceable Brake Mechanism For Power Equipment," U.S. Provisional Patent Application Ser. No. 60/225,212, filed Aug. 14, 2000, entitled "Brake Positioning System," and U.S. patent application Ser. No. 09/929,244, filed Aug. 13, 2001, entitled "Brake Positioning System," now U.S. Pat. No. 666,857,345, the disclosures of which are herein incorporated by reference.

While one particular implementation of safety system 18 has been described, it will be appreciated that many variations and modifications are possible within the scope of the invention. Many such variations and modifications are described in U.S. Provisional Patent Application Ser. No. 60/182,866, filed Feb. 16, 2000, and U.S. Provisional Patent Application Ser. No. 60/157,340, filed Oct. 1, 1999, the disclosures of which are herein incorporated by reference.

Figure 3:
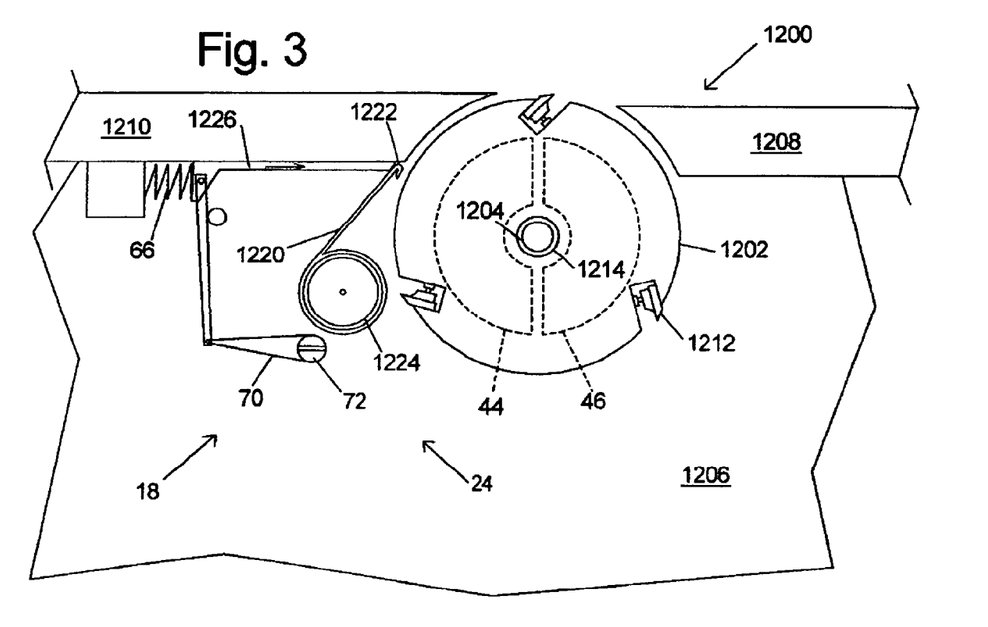
FIG. 3 is a breakaway side elevation view of a reaction system according to the present invention.

FIG. 3 illustrates one embodiment of a reaction system adapted to disable the dangerous portions of a cutting tool. In the embodiment of FIG. 3, the cutting tool is a generally cylindrical cutting head having one or more elongate blades mounted on the outer surface of the cutting head. Such cutters are used in jointers, such as jointer 1200, and planers. In operation, the cutting head is rotated about its cylindrical axis. When a workpiece is passed across the cutting head, the blades make wide cuts into the adjacent surface of the workpiece. As with machines using circular blades described above, machines using cylindrical cutting heads may also cause severe injury if the blades come into contact with the user's body during operation. The reaction subsystem of FIG. 3, indicated at 24, is designed to prevent or minimize such injury. For clarity, many of the components of safety system 18 are not shown in FIG. 3 since they are similar to the components described above in the context of other cutting machines described in the applications incorporated by reference above.

Jointer 1200 includes a generally cylindrical cutterhead 1202 mounted to rotate on an arbor 1204. The arbor typically is mounted in one or more bearing assemblies (not shown) and rotationally driven by a motor assembly (not shown), which is coupled to the arbor either directly or by a belt-and-pulley system. The cutterhead is mounted in a main frame assembly 1206 to extend upward in the space between infeed table 1208 and outfeed table 1210. A workpiece is cut by sliding it along infeed table 1208, past the cutterhead and onto outfeed table 1210. Typically, the vertical positions of the infeed and outfeed tables are independently adjustable to control the depth of cut into a workpiece and alignment with the upper surface of the cutterhead.

The cutterhead is usually constructed of metal, such as steel, and typically includes three knife blades 1212 mounted to extend above the surface of the cutterhead. It will be appreciated that fewer or more knife blades may be used and that the utility of safety system 18 is not limited by the number of blades on cutterhead 1202. One or more electrically non-conductive bushings 1214 are placed between the cutterhead and arbor to insulate the cutterhead and blades from frame 1206. Charge plates 44 and 46 may be placed adjacent the cutterhead to couple the signal generated by detection subsystem 22 across the cutterhead. In FIG. 3, the charge plates (shown in dashed lines) are mounted adjacent one flat end of the cutterhead. Alternatively, the arbor may be insulated from the frame and the charge plates may be positioned around the arbor as described above in U.S. Provisional Patent Application Ser. No. 60/225,211, filed Aug. 14, 2000, entitled "Apparatus And Method For Detecting Dangerous Conditions In Power Equipment," and U.S. patent application Ser. No. 09/929,221, filed Aug. 13, 2001, entitled "Apparatus And Method For Detecting Dangerous Conditions In Power Equipment," which are incorporated herein by reference.

Due to the relatively few blades, first contact between the user's body and the cutterhead may be on one of the blades or on the surface of the cutterhead itself. However, the blades and cutterhead are electrically coupled so that any contact with the user's body is detected regardless of whether or not it occurs on the blades. Once contact is detected, the reaction system is actuated to quickly stop the rotation of cutterhead 1202 and/or disable the blades.

In the embodiment depicted in FIG. 3, safety system 18 includes a reaction system 24 configured to cover the blades to prevent them from causing injury to the user. Specifically, the reaction system of FIG. 3 includes a flexible sheet 1220 such as plastic, rubber, metal foil, metal sheet, metal mesh, fabric, etc., configured to cover the blades. A particularly preferred material is stainless steel sheet 0.005-0.050 inches thick. Sheet 1220 includes a hook 1222 disposed at one end to engage any of the blades 1212. The hook is preferably formed integrally with the sheet in the form of a short fold shaped to catch on a blade. Alternatively, the hook may be separate and joined to the sheet. When hook 1222 is pushed against cutterhead 1202, the next passing blade catches the hook, causing sheet 1220 to wrap around the cutterhead as it rotates. Thus, the blades are covered by sheet 1220, which protects the user from serious injury. Typically, the outer surface of hook 1222 is rounded or beveled to prevent injury to the user when the hook is pulled around the cutterhead.

The sheet preferably extends across the entire width of the cutterhead and is preferably longer than two-thirds of the circumference of the cutterhead to allow it to cover all three blades simultaneously. More preferably, the sheet should be longer than the circumference of the cutterhead to wrap more than once around the head. The sheet is typically formed with an inward curl. The curl reduces the tendency of the sheet to spring away from the cutter head. The free end of the sheet is stored around a spool 1224. The spool may include a torsion spring or other device to limit the number of rotations the spool can undergo, thereby pulling the cutterhead to a stop. Alternatively, the end of material 1220 opposite the hook may be anchored to stop the cutterhead before it makes a full rotation. Additionally or alternatively, the jointer motor assembly may be shut off to stop rotation of the cutterhead.

The hook is moved into contact with the cutterhead by being mounted to the front of a drive plate 1226 or other high speed actuator assembly. The hook may be spot welded or adhesively attached to the plate, secured thereto with soft rivets, or may be provided with several holes through which protrusions on the plate can be pushed. The attachment needs to hold the hook securely during normal use, while allowing it to split away when caught by a blade. The drive plate is preferably substantially as wide as the hook to provide sufficient rigidity to insure that the entire hook engages a blade simultaneously.

Figures 4, 5:
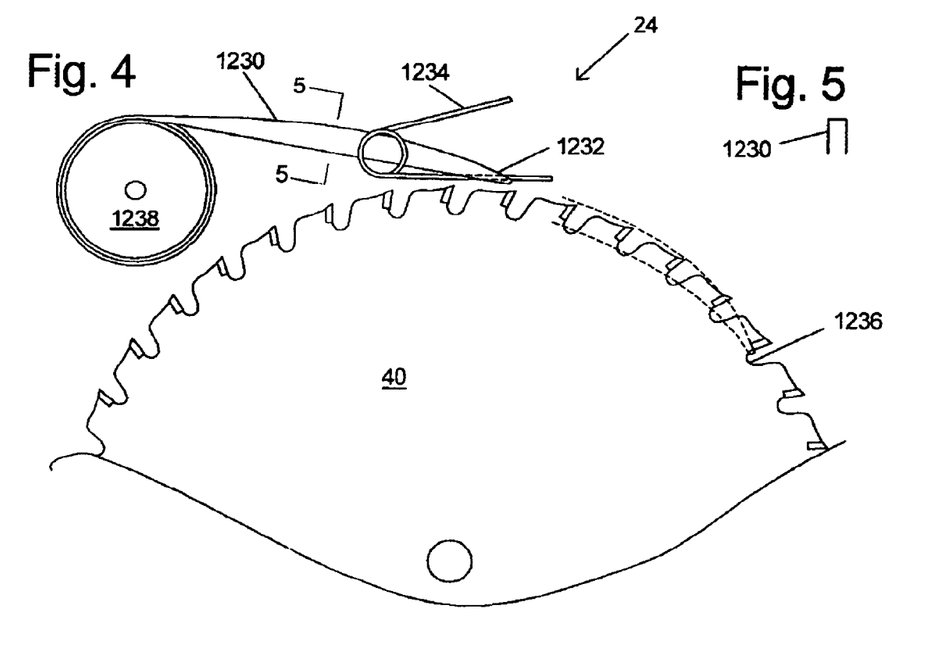
FIG. 4 is a schematic view of an alternative reaction system according to the present invention.
FIG. 5 is a cross-sectional view along lines 5-5 of FIG. 4 of a band forming part of the reaction system of FIG. 4.
Figure 6:
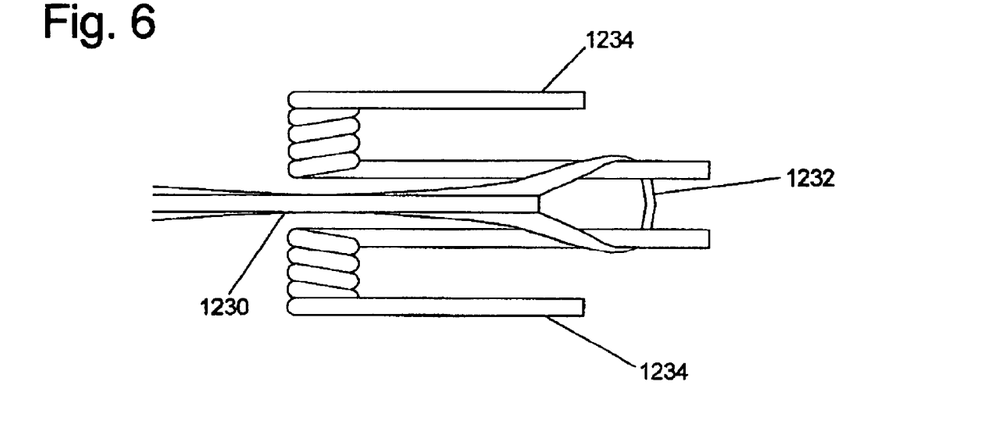
FIG. 6 is a top elevation view of a hook on the end of the band of FIG. 5.

FIGS. 4-6 illustrate an alternative blade covering system for a machine using a circular blade. The reaction system of FIG. 4 includes a band 1230 of flexible material that is used to wrap around the teeth of blade 40. Band 1230 includes a loop 1232 formed at the leading end. The loop is hooked around a pair of torsion springs 1234 and held in place by a guide structure (not shown) secured to the frame of the saw. The springs are held in a cocked position by a fast-acting release system (not shown), such as described above and in U.S. Provisional Patent Application Ser. No. 60/225,056, filed Aug. 14, 2000, entitled "Firing Subsystem For Use In A Fast-Acting Safety System," U.S. patent application Ser. No. 09/929,240, filed Aug. 13, 2001, entitled "Firing Subsystem For Use In A Fast-Acting Safety System," U.S. Provisional Patent Application Ser. No. 60/225,170, filed Aug. 14, 2000, entitled "Spring-Biased Brake Mechanism For Power Equipment," and U.S. patent application Ser. No. 09/929,227, filed Aug. 13, 2001, entitled "Spring-Biased Brake Mechanism For Power Equipment," which are incorporated herein by reference. When the springs are released, they pull loop 1232 down into a gullet 1236 of blade 40. The gullet captures the leading edge of the loop and pulls the loop off of the springs and drags the band forward as illustrated by the dashed lines in FIG. 4. The width of the loop forms a shock absorbing structure to absorb some of the impact of the gullet catching the loop. It is also possible to provide a compressible material at the leading end of the loop as a shock absorbing system to reduce impact loading.

The trailing section of the band is shaped to fold over the teeth of the blade, as shown in FIG. 5. The trailing section of the band is stored on a spool 1238. The C-shape of the band flattens out when the band is wound on the spool. The band is preferably formed of a spring-temper material to return to an unbiased C-shape when curved to match the perimeter of the blade, such as spring temper stainless steel of 0.005 to 0.050 thickness.

The leading end of the band is preferably positioned as close as possible to the location where the blade emerges from the guard or housing on the saw. This insures that the band will reach the location of the user as soon as possible to minimize injury. The motor of the saw will preferably be disengaged as soon as the reaction system is actuated. In addition, the reaction system of FIGS. 4-6 is also preferably used in connection with translation stopping systems such as described in U.S. Provisional Patent Application Ser. No. 60/225,210, filed Aug. 14, 2000, entitled "Translation Stop For Use In Power Equipment," and U.S. patent application Ser. No. 09/929,425, filed Aug. 13, 2001, entitled "Translation Stop For Use In Power Equipment," or retraction systems such as shown in U.S. Provisional Patent Application Ser. No. 60/225,089, filed Aug. 14, 2000, entitled "Retraction System For Use In Power Equipment," and U.S. patent application Ser. No. 09/929,242, filed Aug. 13, 2001, entitled "Retraction System For Use In Power Equipment," which are incorporated herein by reference, to further minimize injury.

Figure 7:
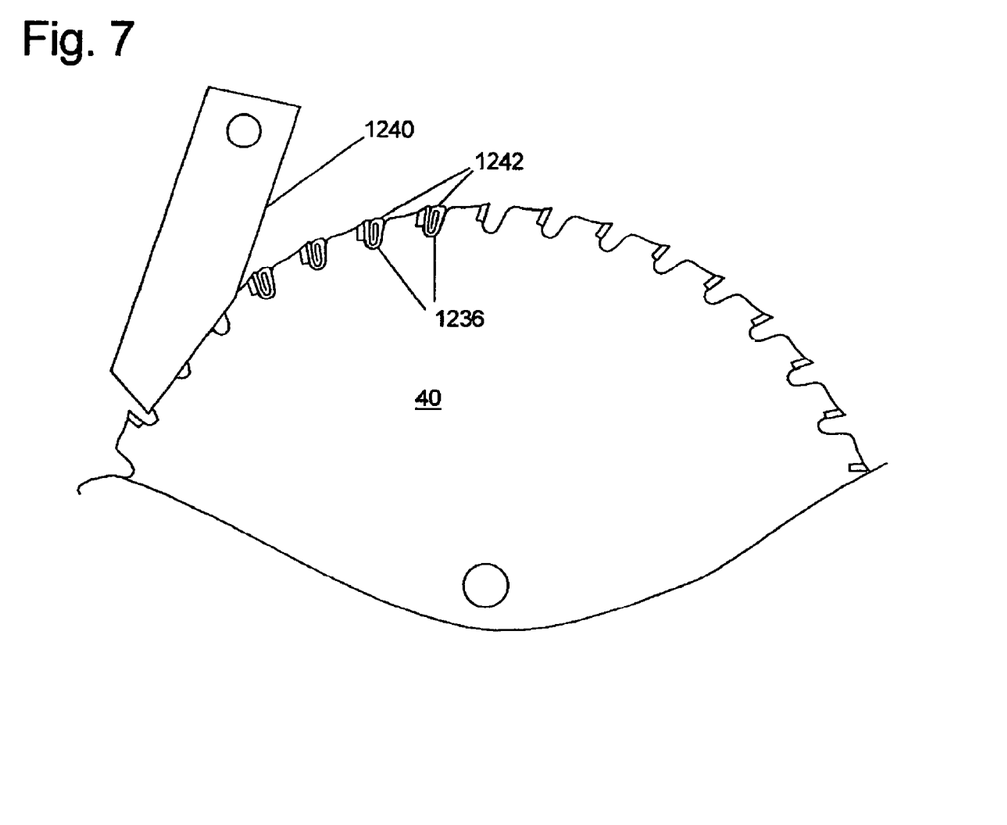
FIG. 7 is a schematic view of an alternative reaction system for obstructing a blade.

FIG. 7 illustrates another alternative reaction system in which the cutter is obstructed upon actuation of the reaction system. In particular, a pawl 1240 is pushed into contact with the teeth of blade 40 upon actuation of the reaction system. The pawl is preferably formed from a plastic material, such as polycarbonate, that forms curls 1242 in gullets 1236 between the teeth upon being cut by the teeth. The curls block the sharp edges of the teeth to prevent the teeth from cutting into a user. The pawl may also be constructed from material softer than polycarbonate, such as ultra-high molecular weight polyethylene (UHMWPE) to reduce the braking effect on the blade as the curls are formed. The blade should preferably have gullets that are shaped with relatively parallel sides to minimize the tendency of the curls to slip out. As with the band system described above, it is preferable that the pawl be located as close as possible to where the blade emerges from the guard or housing to minimize the number of unblocked teeth to which the user is exposed. Of course, the same principle can be applied to other cutters, such as a jointer or shaper, with appropriate modification.

Figure 8:
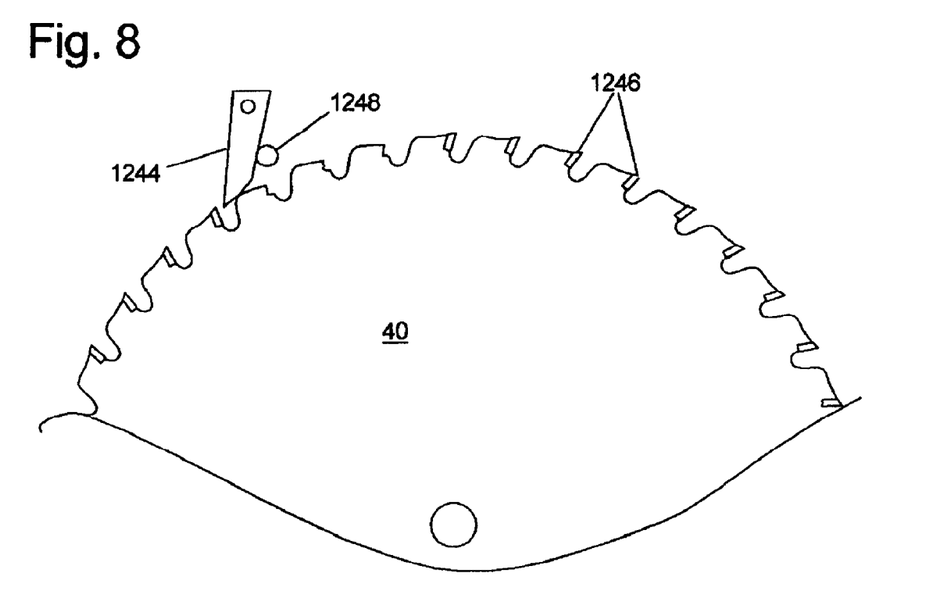
FIG. 8 is a schematic view of an alternative reaction system that breaks the teeth of a blade.

FIG. 8 illustrates another alternative reaction system in which the teeth on the cutter are broken or shifted. A pawl 1244 is provided to selectively engage the teeth of blade 40. The pawl is formed of a material hard enough to dislodge or break the carbide inserts 1246 on the teeth upon contact. Suitable materials would include carbide and hardened steel. The pawl is actuated by the mechanism described above for brake pawl 60. When actuated, the pawl shifts into the path of the teeth of the blade, as illustrated in FIG. 8. The pawl shifts into contact with a brace structure 1248 adapted and positioned to support the pawl against the teeth. Brace structure may be in any suitable form including a pin, post, bracket, etc. In any event, the carbide inserts are shattered by the impact from striking the pawl. This reaction system is preferably used in conjunction with translation stopping systems or retraction systems, and serves primarily to generate sufficient user-to-blade clearance to give the translation or retraction system more time to operate.

Figure 9:
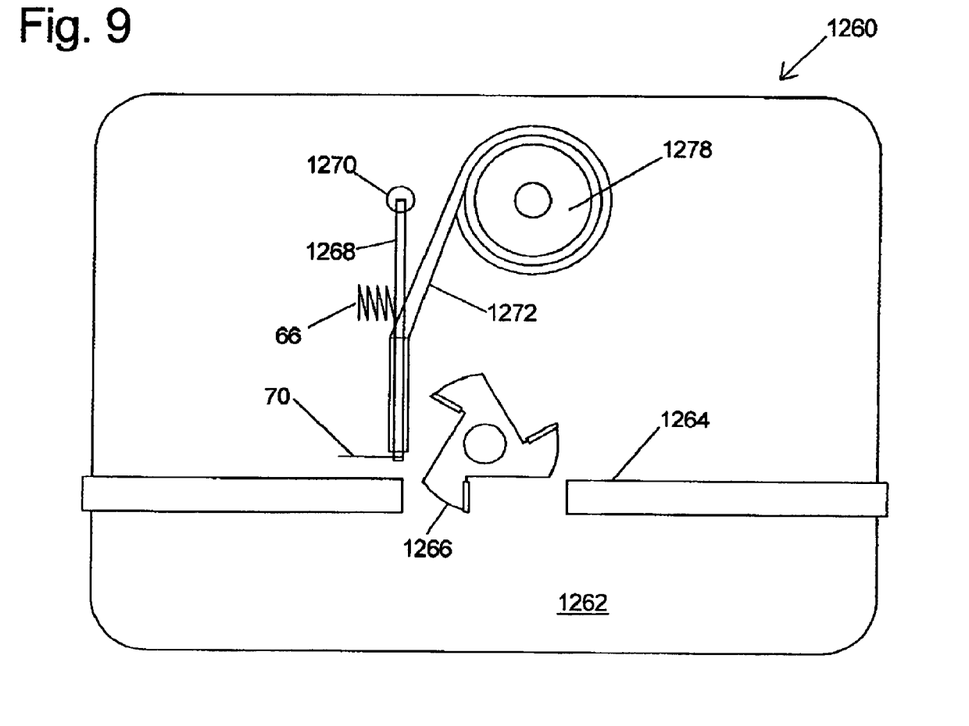
FIG. 9 is a top view of an alternative reaction system that wraps a cutting tool.
Figure 10:
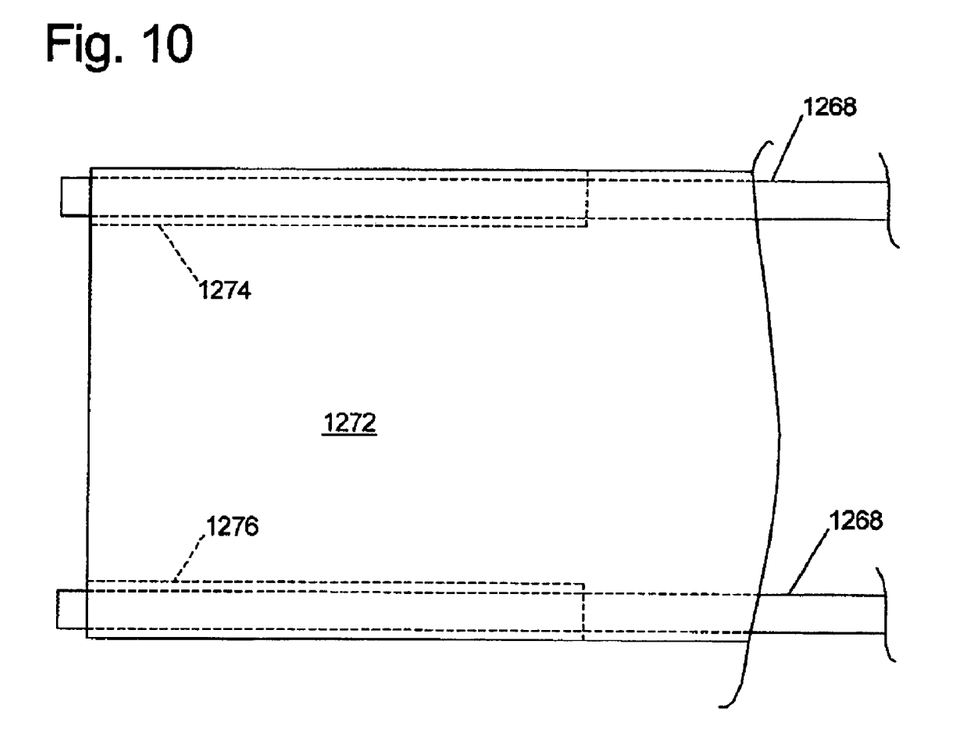
FIG. 10 shows a covering used in the reaction system of FIG. 9.

FIGS. 9 and 10 illustrate another embodiment of a reaction system in which a cutting tool is wrapped with a covering. A shaper is shown at 1260 with a work surface 1262, a fence 1264 and a cutting head 1266. A workpiece is slid on the work surface and along the fence past the cutting tool. The cutting tool shapes the workpiece at is moves past. The safety system on shaper 1260 includes a pair of vertically spaced shafts 1268 that pivot around pin 1270. Shafts 1268 are biased toward cutting head 1266 by spring 66, as explained above in connection with other embodiments. A fusible member 70 restrains shafts 1268 from pivoting toward the cutting head. A covering 1272, which takes the form of a sheet of material, is mounted between the two shafts as shown in FIG. 10. The covering is mounted to the shafts by pockets 1274 and 1276 formed in the material. The shafts are slipped into the pockets so that the covering spans the area between the shafts. The pockets extend along the upper and lower edges of the covering on the end of the covering adjacent the shafts. The covering extends away from the shafts and is wound on a spool 1278. When the system detects accidental contact with cutting head 1266, as described above in connection with other embodiments, fusible member 70 is burned and shafts 1268 are released to pivot toward the cutting head because of spring 66. When shafts 1268 move toward the cutting head, the covering contacts the cutting head and the cutting head catches on or bites into the covering and pulls the covering off of shafts 1268 and off of spindle 1278 until the covering has wrapped the cutting head. The covering can be any material sufficiently strong to absorb the sudden acceleration when caught on the cutting head, and sufficiently pliable to catch on the cutting head and wrap around it. Possible materials include Kevlar fabric, stainless steel mesh, natural or synthetic fabrics, etc. The covering may be used in connection with an internal brake to more rapidly slow the cutting head or the power to the motor may be disengaged to stop the cutting head.

The various embodiments described above for covering, blocking or disabling the cutter are particularly suitable for use on relatively light machinery, such as portable circular saws and miter saws, or on machinery with relatively heavy cutters such as jointers, shapers and planers.

INDUSTRIAL APPLICABILITY

The present invention is applicable to power equipment, and specifically to woodworking equipment such as table saws, miter saws, band saws, circular saws, jointers, etc.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. No single feature, function, element or property of the disclosed embodiments is essential to all of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

The invention claimed is:

1. A safety mechanism for protecting a user from a cutting edge of a circular blade in a power tool, the safety mechanism comprising:
   a guard disposed proximate to the blade, the guard enclosing at least a portion of the cutting edge of the blade to provide a barrier between the enclosed portion of the cutting edge and the user, said guard operable to move between a first position and a second position, where said second position encloses a greater portion of the cutting edge than the first position;
   an engagement member disposed on said guard and operable to contact said cutting edge of the blade, where contact of said engagement member with the blade causes said guard to move from said first position to said second position; and a trigger device operable to deploy said engagement member into contact with the blade.

* * * * *